April 24, 1962     F. A. GUERTH     3,031,652
SHAFT POSITION INDICATOR
Filed Oct. 19, 1959     2 Sheets-Sheet 1
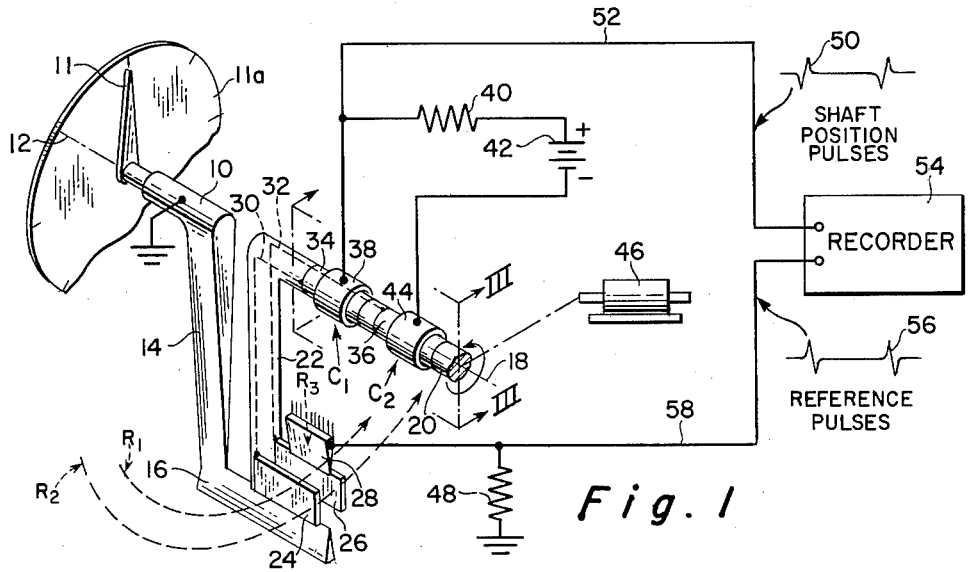
Fig. 1
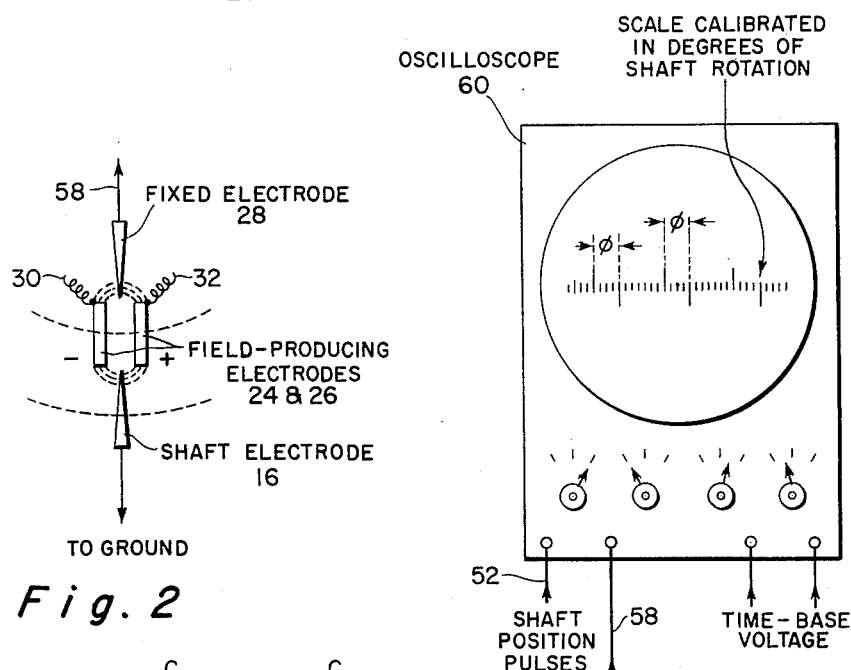
Fig. 2
Fig. 4
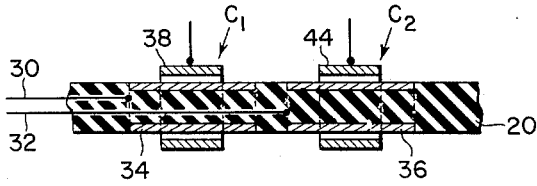
Fig. 3
INVENTOR.
FRITZ A. GUERTH
BY
ATTORNEYS April 24, 1962     F. A. GUERTH     3,031,652
SHAFT POSITION INDICATOR
Filed Oct. 19, 1959     2 Sheets-Sheet 2

INVENTOR.
FRITZ A. GUERTH

United States Patent Office

3,031,652
Patented Apr. 24, 1962

3,031,652
SHAFT POSITION INDICATOR
Fritz A. Guerth, 50 Lori Road, Camarillo, Calif.
Filed Oct. 19, 1959, Ser. No. 847,438
2 Claims. (Cl. 340—200)
(Granted under Title 35, U.S. Code (1952), sec. 266)

The invention described herein may be manufactured and used by or for the Government of the United States of America for governmental purposes without the payment of any royalties thereon or therefor.

The present invention relates to means for indicating the instantaneous angular position of a shaft which is subject to relatively slow rotation about its axis, such, for example, as the output shaft of a temperature-measuring instrument. The invention is also useful in yielding information regarding some aspect of the operation of a mechanism in cases where the condition can be represented by the instantaneous angular position of a rotatable component thereof.

While is is customary in numerous environments to employ indicators, such as meters, to visually check the condition of some portion of a system or machine, it is frequently desirable to convert this visual information into an electrical potential so that it may be utilized to regulate other apparatus the operation of which is a function of the status of the component producing the voltage. Indicators now employed for this purpose, such as potentiometers the moving element of which is actuated by the meter shaft or by some other rotatable member the position of which it is desired to ascertain, lack the high degree of accuracy required to represent the precise operation conditions of such extremely complex assemblies as are now incorporated, for example, in supersonic aircraft or in guided missiles and rockets. Then, too, it is becoming increasingly advantageous to electronically record the derived information for subsequent inspection and evaluation, as in cases where it is desired to determine the reason for some malfunctioning of a control system, or the cause of failure of a carefully-prepared operation such as a missile launching. The extremely short interval of time within which such an action ordinarily occurs renders impractical the use of any means for visually depicting this data by meters or other indicators which yield no permanent record of the intelligence so obtained. Still further, when this data is telemetered to a remote location, it is frequently multiplexed with other signals in order to conserve bandwidth, and it is highly desirable that it be in a form which is readily adaptable to this type of transmission.

The present concept makes use of means to translate the instantaneous angular position of a shaft into an electrical pulse the time position of which can be compared to that of a reference pulse indicative of zero degrees of shaft rotation. The time spacing between the pulses is thus representative of the amount of angular rotation of the shaft at the instant of pulse production, or, in other words, the number of degrees of shaft departure from zero position. The time scale may obviously be chosen to read in terms of any desired unit of measurement, and, when the pulses are applied to a tape recorder, the speed thereof may be synchronized with, or made a function of, the rate at which the positional pulses are generated.

One object of the invention, therefore, is to provide improved means for indicating the instantaneous angular position of a member which is adapted for relatively slow rotation about an axis.

Another object of the invention is to provide means for producing a first series of pulses indicative of the instantaneous angular position of a rotatable member, producing a second series of pulses indicative of a reference position, and then measuring the time displacement between corresponding pulses of the two series to determine the angular displacement of said rotatable member from the said reference position.

A further object of the invention is to provide a pulse-producing member coaxially arranged with respect to a shaft the instantaneous angular position of which it is desired to ascertain, and then rotating such member so that during each rotation thereof two pulses are produced one of which is representative of the instantaneous angular shaft position and the other of which is a reference pulse indicative of zero degrees of shaft rotation.

Other objects and many of the attendant advantages of this invention will be readily appreciated as the same becomes better understood by reference to the following detailed description when considered in connection with the accompanying drawings wherein:

FIG. 1 is a partly schematic representation of a shaft position indicator designed in accordance with a preferred embodiment of the present invention;

FIG. 2 is an end view of the electrodes of FIG. 1 showing the relative positioning thereof;

FIG. 3 is a cross-sectional view of a portion of FIG. 1 showing the construction of one of the rotatable shafts;

Figure 5:
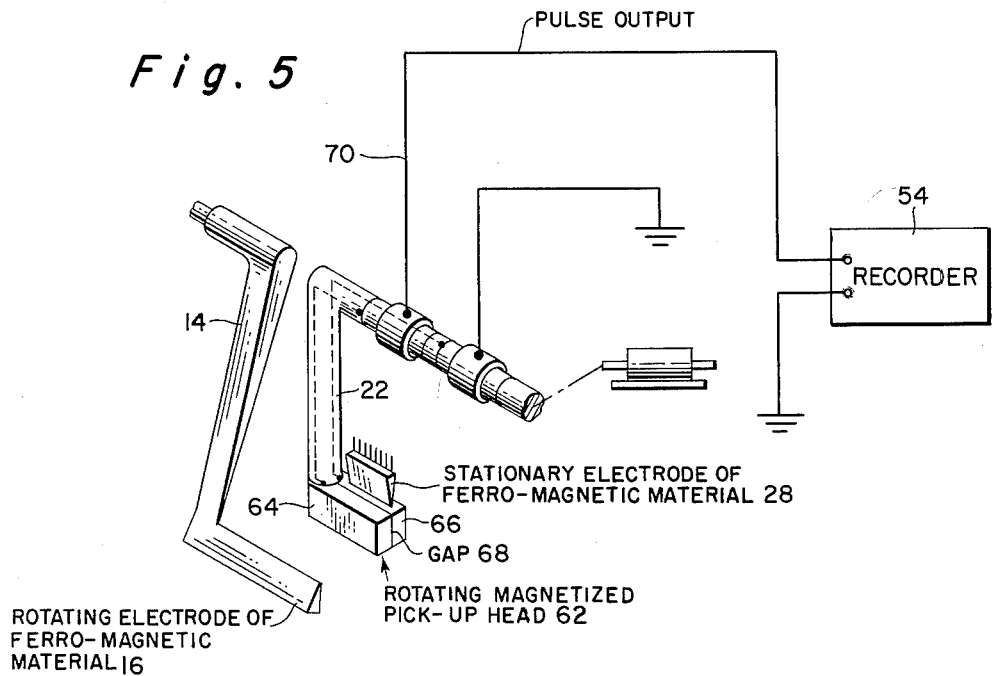
Figure 6:
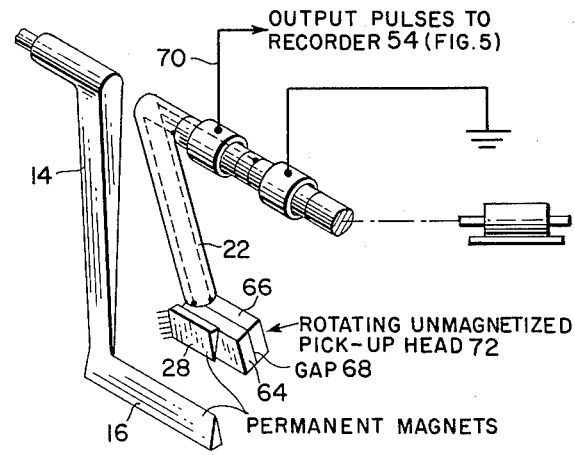

FIG. 4 is a representation of one manner in which the pulses produced by the shaft position indicator of FIGS. 1 through 3 might appear on the screen of an oscilloscope when visual observation thereof is desired; and FIGS. 5 and 6 are modifications of the shaft position indicator of FIGS. 1 through 3.

Referring now to FIG. 1 of the drawings, there is illustrated a rotatable shaft 10 the instantaneous angular position of which it is desired to determine. Shaft 10 may, for example, form part of a temperature-measuring instrument or meter which includes the pointer 11 and dial 11a, or it may be a slowly rotating component of some machine or mechanism the operation of which is in some way related to, or associated with, the angular position of the shaft at a given instant of time. Shaft 10 rotates about an axis 12.

Extending radially from shaft 10 is an arm 14 which carries on the further extremity thereof a knife-blade electrode 16. The latter projects at right angles to arm 14 and lies essentially parallel to shaft 10, with its flattened surfaces in a broad sense defining a plane which includes the axis 12 about which the shaft 10 rotates. Since the elements 10, 14 and 16 form a rigid assembly, electrode 16 makes one complete revolution about axis 12 for each corresponding rotation of shaft 10. The assembly 14, 16 (together with at least a portion of shaft 10) is composed of electrically-conductive material, so that the electrode 16 is maintained at ground potential in any suitable manner, such condition being only schematically set forth in the drawing for the sake of clarity of illustration.

Positioned for rotation about an axis 18 is a second shaft 20 having an arm 22 which extends radially therefrom in a manner similar to that in which arm 14 extends from shaft 10. Axis 18 constitutes in effect an extension of axis 12, so that the two shafts 10 and 20 rotate in coaxial fashion. However, since the shafts are physically separate one from the other, rotation of shaft 20 occurs independently of any rotation of shaft 10.

Carried on the outer extremity of arm 22 are two knife-blade electrodes 24 and 26 disposed side-by-side in spaced-apart relation and respectively lying in planes which are parallel both to one another and to the plane of the electrode 16 which is attached to arm 14 (see also FIG. 2). As shaft 20 rotates, the unitary electrodes 24 and 26 travel in a circular path, as indicated in the drawing by the arrow. This path has a radius $R_1$. The electrode 16 also travels in a circular path as shaft 10 rotates, this path having the radius $R_2$. However, the radius of arm 22 is less than that of arm 14 ($R_2>R_1$) so that the electrodes 24, 26 do not contact the electrode 16 during rotation, but instead pass in close proximity to one another, the clearance therebetween being kept at a minimum for reasons which will later become apparent. This again is clearly brought out in FIG. 2 of the drawings.

A still further knife-blade electrode 28 is positioned so as to lie out of contact with, but in close proximity to, the electrodes 24 and 26 as the latter rotate in unitary fashion with the shaft 20. This electrode 28 is fixed in position relative to the rotatable shafts 10 and 20, and preferably has a configuration similar to that of the shaft electrode 16. As in the case of the latter, electrode 28 generally defines a plane which includes the axis 18 about which the shaft 20 rotates. However, electrode 28 is located at a lesser radial distance $R_3$ (FIG. 1) from axis 18 than are the electrodes 24 and 26, so that $R_3<R_1<R_2$. Expressed differently, electrode 28 lies within the circular path traced by the rotating electrodes 24 and 26, while electrode 16 lies outside this path regardless of the instantaneous angular position of electrode 16 about its rotational axis 18.

Shaft 20, as well as the arm 22 carried thereby, is composed of electrically-insulative material, within which are embedded or molded two conductors 30 and 32 respectively connected to the knife-blade electrodes 24 and 26. The conductor 30 is soldered, or otherwise securely joined, to the inner tubular component or sleeve 34 of a first coaxial capacitor $C_1$. Conductor 32 is similarly connected to the inner tubular component or sleeve 36 of a second coaxial capacitor $C_2$, the two capacitor assemblies being longitudinally spaced along the shaft 20 as shown in FIG. 1. The outer tubular component or electrode 38 of capacitor $C_1$ is connected through a resistor 40 to the positive terminal of a source of potential 42, while the outer tubular component or electrode 44 of capacitor $C_2$ is connected to the negative terminal of this potential source. Alternatively, both inner and outer electrodes of $C_1$ and $C_2$ may rotate and a slip-ring assembly (not shown) utilized to conduct energy thereto. The effect of these connections is to place positive and negative voltages, respectively, on the two electrodes 26 and 24, or, in other words, these elements are caused to act as a capacitor between which an electrostatic field is developed. This is schematically depicted in FIG. 2. Such electrostatic field not only exists in the space between the electrodes, but extends outwardly around the edges thereof. Thus the shaft electrode 16, as well as the fixed electrode 28, comes within this electrostatic field as the shaft 20 is rotated at constant speed by some suitable means such as a synchronous motor 46.

The electrode 16, as stated above, is grounded by any suitable means. Electrode 28 is connected to ground through a resistor 48. It will accordingly be seen that if the electrostatic field surrounding the capacitor electrodes 24 and 26 closely passes by the shaft electrode 16, there is a discharge of the capacitor to ground. This momentarily lowers the voltage appearing across resistor 40, and the varying voltage thus developed as the shaft 20 rotates (which is in the form of a series of negative pulses 50) is applied over a conductor 52 to a conventional recorder 54.

Each passage of the capacitor electrodes 24 and 26 by the fixed electrode 28, however, produces a positive surge of voltage across resistor 48, and these surges, in the form of a series of positive pulses 56, are applied over conductor 58 to the recorder 54. It will now be appreciated that each pulse of the series 56 is a reference pulse indicative of the passage of the field-producing elements 24 and 26 past the fixed position represented by electrode 28. Each pulse of the series 50, however, is a data pulse representative of the instantaneous angular position of the shaft 10 as represented by the location of electrode 16. Obviously, the time displacement between corresponding pulses of these two series is representative of the instantaneous angular rotation $\phi$ of shaft 10 if the position of fixed electrode 28 is taken as zero degrees of such rotation.

FIG. 4 illustrates one manner in which the two pulse series 50 and 56 might appear on the screen of an oscilloscope 60 when applied thereto rather than to the recorder 54. The X-axis of the oscilloscope may, if desired, be calibrated in degrees of angular rotation of shaft 10, so that the instantaneous angular rotation $\phi$ may be obtained directly. Of course, each reference pulse may alternatively be employed to trigger the sweep circuit of the oscilloscope, so that a single data pulse would then be visible on an enlarged scale. This would permit a more accurate reading of shaft position.

In place of the capacitive assembly formed by the electrodes 24 and 26 of FIG. 1, it is feasible to generate the reference and data pulses by means of a rotating magnetized pick-up head 62 (as shown in FIG. 5) this unit being composed of two magnetized members 64 and 66 separated by a gap 68. Both of the electrodes 16 and 28 of FIG. 1 in such a case are composed of ferromagnetic material, so that each time one of these electrodes is aligned with the gap 68, the field across the gap is altered and a pulse developed in output conductor 70. No external source of energy (such as the battery 42) is required in the arrangement of FIG. 5. For each rotation of the pick-up head 62, two pulses are generated the time displacement of which is indicative of the instantaneous angular position of shaft 10 in a manner similar to that in which the circuit of FIG. 1 operates.

If it is desired to employ an unmagnetized pick-up head instead of the magnetized head 62 of FIG. 5, it is possible to utilize the unit 72, as shown in FIG. 6. Similar in constructional features to the head 62, the two members 64 and 66 are in this case unmagnetized, so that no field customarily exists across the gap 68. Pick-up heads of this general nature are described in applicant's co-pending U.S. Patent application Serial No. 767,-239, filed October 14, 1958. The electrodes 16 and 28 are now formed as permanent magnets, so that the lines of force around each such magnet are cut by the pick-up head 72 as the latter rotates. This causes a pulse to be developed in output conductor 70 for application to the recorder 54 of FIGS. 1 and 5 or to the oscilloscope 60 of FIG. 4, as desired.

It will be understood that the precise configuration of the electrodes 16, 24, 26 and 28, as well as that of the pick-up heads 62 and 72, is not critical, but that their shape may undergo wide variations as long as the required environmental conditions are brought about. In the embodiment of FIG. 1, it is only necessary that a rotating field of force be developed, and that this rotating field of force be in some manner intercepted during each rotational cycle both by a stationary electrode and by an electrode associated with the shaft the position of which it is desired to ascertain.

Obviously many modifications and variations of the present invention are possible in the light of the above teachings. It is therefore to be understood that within the scope of the appended claims the invention may be practiced otherwise than as specifically described.

I claim:

1. Apparatus for determining the instantaneous angular position of a rotatable shaft, said apparatus comprising: a capacitor positioned for rotation co-axially with said shaft; means for rotating said capacitor at a substantially constant speed; means for developing an electrostatic field which extends externally of said capacitor; a fixed electrode positioned to momentarily enter said electrostatic field during each rotation of said capacitor; a second electrode rigidly secured to said shaft and rotatable therewith, said second electrode also being positioned to momentarily enter said electrostatic field during each rotation of said capacitor; circuit means for developing a first series of voltage pulses indicative of the passage of said rotating capacitor by said fixed electrode; circuit means for developing a second series of voltage pulses indicative of the passage of said rotating capacitor by the electrode secured to said shaft; and means for measuring the time displacement between corresponding voltage pulses of said first and second series to determine the instantaneous angular position of said rotatable shaft.

2. Apparatus for determining the instantaneous angular position of a member rotatable about an axis from which it extends in a radial direction, said apparatus comprising: means for producing an electrostatic field, said field-producing means being positioned for rotation as a unit coaxially with said member; said field-producing means comprising a capacitor made up of a pair of knife-blade electrodes lying in spaced-apart planes parallel both to each other and to the plane which includes said rotatable member and said axis; means for rotating said capacitor at a substantially constant speed; a fixed electrode positioned to momentarily enter said electrostatic field during each rotation of said capacitor; a second electrode rigidly secured to said member and rotatable therewith, said second electrode also being positioned to momentarily enter said electrostatic field during each rotation of said capacitor; circuit means for developing a first series of voltage pulses indicative of the passage of said rotating capacitor by said fixed electrode; circuit means for developing a second series of voltage pulses indicative of the passage of said rotating capacitor by the electrode secured to said member; and means for measuring the time displacement between corresponding voltage pulses of said first and second series to determine the instantaneous angular position of said rotatable member.

References Cited in the file of this patent

UNITED STATES PATENTS

| | | |
|---|---|---|
| 2,680,241 | Gridley | June 1, 1954 |
| 2,730,698 | Davids | Jan. 10, 1956 |
| 2,734,188 | Jacobs | Feb. 7, 1956 |
| 2,930,033 | Webb | Mar. 22, 1960 |